US007020313B2

(12) United States Patent
Declerck et al.

(10) Patent No.: US 7,020,313 B2
(45) Date of Patent: Mar. 28, 2006

(54) REGISTRATION OF MULTI-MODALITY DATA IN IMAGING

(75) Inventors: Jérôme Marie Joseph Declerck, Oxford (GB); Christian Peter Behrenbruch, Oxford (GB)

(73) Assignee: Mirada Solutions Limited, Oxford (GB)

( * ) Notice: Subject to any disclaimer, the term of this patent is extended or adjusted under 35 U.S.C. 154(b) by 200 days.

(21) Appl. No.: 10/618,565

(22) Filed: Jul. 11, 2003

(65) Prior Publication Data

US 2004/0071325 A1 Apr. 15, 2004

(30) Foreign Application Priority Data

Jul. 19, 2002 (GB) .................................... 0216854

(51) Int. Cl.
*G06K 9/00* (2006.01)

(52) U.S. Cl. ....................................... 382/128; 382/294

(58) Field of Classification Search ................ 382/128, 382/130, 131, 132, 294, 295; 600/407, 427; 128/922, 920; 378/62, 98; 345/424, 629
See application file for complete search history.

(56) References Cited

U.S. PATENT DOCUMENTS 3,974,386 A 8/1976 Mistretta et al.
4,977,505 A 12/1990 Pelizzari et al.
5,672,877 A 9/1997 Liebig et al.
5,871,013 A 2/1999 Wainer et al.
5,999,840 A 12/1999 Grimson et al.
2001/0021806 A1 9/2001 Gueziec et al.
2002/0048393 A1* 4/2002 Oosawa ...................... 382/132
2002/0122576 A1* 9/2002 Weese et al. ............... 382/131
2003/0233039 A1* 12/2003 Shao et al. ................. 600/407
2004/0030246 A1* 2/2004 Townsend et al. .......... 600/427

OTHER PUBLICATIONS

Maintz et al., "A survey of medical image registration," Medical Image Analysis (1998) 2(1):1-36.
Thirion, "New Feature Points based on Geometric Invariants for 3D Image Registration," INRIA (1993) 1-31.
Anderson et al., "A Method for Conregistration of PET and MR Brain Images," J. Nuclear Medicine, 36(7):1307-1315 (Jul. 1995).

(Continued)

*Primary Examiner*—Von J. Couso
(74) *Attorney, Agent, or Firm*—Carol M. LaSalle; Bozicevic, Field & Francis LLP

(57) ABSTRACT

A method of registration of a functional emission image to another image, e.g. a structural/anatomical image, is disclosed in which the emission image is first processed to mask out regions of the background and lungs identified in a corresponding transmission image. Only areas which are not masked out in the emission image are matched to areas in the x-ray image. The x-ray image and masked emission image may then be displayed in superposition.

19 Claims, 5 Drawing Sheets

OTHER PUBLICATIONS

Chatziiannou, A. et al., "Visualization of Whole body PET Images" Nuclear Science Symposium and Medical Imaging Conference, 1994 IEEE Conference Record (Cat. No. 94CH35762) 3:1399-402 (1994).

Ivanovic, M. et al., "Monte Carlo Simulation Study of Multi-Window Imaging" Nuclear Science Symposium and Medical Imaging Conferece, 1995 IEEE Conference Record (Cat. No. 94CH35762) 3:1301-4 (1995).

Engelstad et al, "Information extract from multi-modality medical imaging" Proceedings of the SPIE—The International Society for Optical Engineering, 902:144-9 (1988).

Yu, J et al., "Intermodality, Retrospective Image Registration in the Thorax" Journal of Nuclear Medicine, 36(12) 2333-2338 (Dec. 1995).

Wahl, RL, "Anatometabolic" tumor imaging: fusion of FDG PET with CT or MRI to localize foci of increased activity The Journal of Nuclear Medicine, 34(7):1190-1197 (1993).

Wahl, RL, "Anatometabolic" Tumor Imaging: Fusion of FDG PET with CT or MRI to Localize Foci of Increased Activity, The Journal of Nuclear Medicine, 34(7):1190-1197 (Jul. 1993).

Pelizzari, CA et al., "Accurate Three-Dimensional Registration of CT, PET, and/or MR Images of the Brain," J. Comput. Assist. Tomogr., 13(1):20-26 (1989).

Levin et al., "Retrospective Geometric Correlation of MR, CT, and PET Images" Radiology 169:817-823 (1998).

Alpert et al., "The Principal Axes Transformation—A Method for Image Registration" The Journal of Nuclear Medicine, 31(10):1717-1722 (Oct. 1990).

Woods et al., "MRI-PET Registration with Automated Algorithm" J. Comput. Assist. Tomogr., 17(4):536-546 (1993).

* cited by examiner

Figure 5
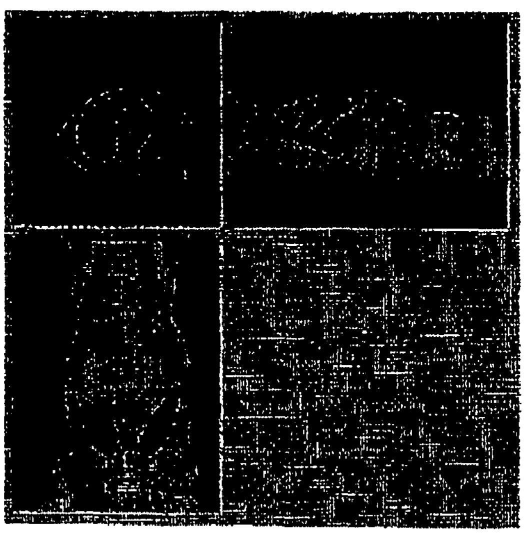
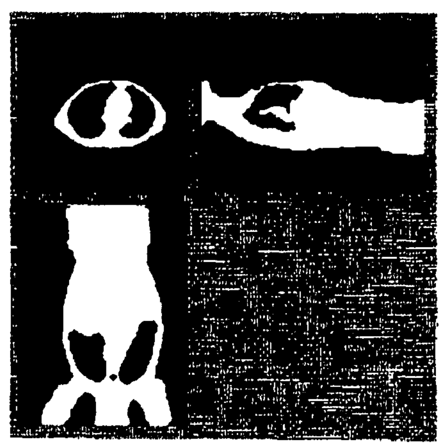
Figure 9
Figure 10

REGISTRATION OF MULTI-MODALITY DATA IN IMAGING

The present invention relates to the registration of images of different modalities, in particular so that such images may be displayed together, accurately superposed upon one another.

There are many fields in which it is useful to image a subject using different modalities. For instance, one modality might provide detailed structural information about the subject, for instance an x-ray image or a magnetic resonance image, while another modalities might provide information about different structures not visible in the first modality, or information about functions occurring within the subject, such as by the introduction into the subject of a radioactive marker. While such different modality images can be considered side-by-side by someone trying to use the information given by the two different modalities; it is often useful to display the images in superposition one upon the other. It is clearly necessary for the superposition to be accurate, in other words for areas representing a particular position in the subject in one image to be accurately positioned in registration with corresponding areas in the other image. The process of achieving this alignment is known as "registration". It is particularly useful because the display of the superposed images allows the information from the different modalities to be interpreted very easily by a user. For example, the information about function from one modality can be related accurately to the detailed structural information from another modality.

A variety of techniques for registration of images of different modalities, particularly in the medical imaging field, have been proposed. For example, detailed anatomical information about the structure of the body can be obtained from traditional x-ray images. Information about the metabolic function in the body can be obtained from different modalities, such as nuclear medicine. In a typical technique a radioactive marker is fixed to a physiological tracer. The tracer is injected in the blood of the patient and fixes to the cells in the patient according to the metabolic activity (consumption of oxygen, or glucose etc). A detector is used to detect the disintegration of the radioactive marker and to provide a corresponding image whose intensities correspond to the amount of radioactive marker in each region. The results of several scans may be combined together in the process known as tomography to provide 3-D information. Typical nuclear medicine techniques include photon coincidence detection (PET) and single photon emission computerised tomography (SPECT). Such images are typically called emission images. One particularly important application of them is to the detection of tumours in the body. Such tumours are prominent in an emission images because of the high metabolic activity in and around the tumour. In the accompanying drawings FIG. 1 shows an example of an SPECT image, with areas of higher metabolic activity shown in lighter colours.

For some years such emission images have been acquired simultaneously with another image, called a transmission image, such as a single photon transmission computerised tomography (SPTCT) image, which is obtained by placing a source of radiation on the opposite side of the subject's body from the detector. This provides an image which provides information regarding the attenuation and scattering characteristics of the subject's body. FIG. 2 shows an example of such a transmission image. This transmission image is used to correct the emission image for the different attenuation and scattering occurring in different areas of the body. The need for such correction is illustrated by FIGS. 3 and 4 of the accompanying drawings. The problem is that in an emission image, photons emitted from different parts of the body, e.g. from different depths or from different structures, will undergo different attenuation and scattering. This will lead to varying intensities in the image which are not related to the metabolic function in the body. The transmission image effectively provides information about the differing attenuation and scattering and allows correction of the emission image. FIG. 3 illustrates an emission image of a uniform cylindrical phantom before correction. It can be seen that although the phantom is uniform, and thus should have a uniform intensity, in fact the central areas are darker because of greater attenuation. FIG. 4 illustrates such an image corrected by means of a transmission image. The uniformity is restored.

A problem with nuclear medicine images, such as emission images, is that while they give good information about function, they do not give very good information about the structure of the subject. In particular, the exact location of regions of high metabolic function cannot be accurately determined. This is because the emission image does not show much structural detail. Many other imaging modalities reveal detailed structure, but obviously not the functional information of the nuclear medicine images. However, the lack of common information, i.e. the fact that the nuclear medicine images do not include detailed structure, and the fact that the other modality images do not include functional information, means that using the information from the two images, e.g. by matching the two images in order to register them accurately, is difficult. FIG. 5 of the accompanying drawings shows a typical detailed structural image obtained, in this case, by x-ray imaging.

U.S. Pat. No. 5,871,013 and U.S. Pat. No. 5,672,877 both disclose methods of registering functional nuclear medicine emission images with other modality images, such as x-ray images, by using the transmission image (e.g. FIG. 2) as a stepping stone in the registration process. This takes advantage of the fact that the transmission image is customarily obtained on the same imaging equipment as the functional emission image and so is inherently registered (i.e. the same pixel address in the image frame corresponds to the same position in the body). Furthermore, the transmission image includes some structural information, such as the edge of the body and the edges of the lungs, which are also visible in the different modality structural image. Therefore the registration of the transmission image with the different modality structural image is easier than direct registration of the functional emission image with the other modality image. In both patents, by first deriving a mathematical relationship mapping between the transmission image and the other modality image, a mapping between the functional emission image and the other modality can also be obtained because the relationship between the transmission image and the functional emission image is already known. Thus registration of the functional emission image with the other modality image is achieved without any matching process between the two images.

In accordance with the present invention there is provided:

a method of registering images of different modalities, comprising:

taking a first image of a subject obtained by an imaging process of a first modality;

taking a second image of the subject obtained by an imaging process of a second modality, said second image having a known positional relationship with the first image;

taking a third image of the subject obtained by an imaging process of a third modality;

distinguishing between at least one area of interest and at least one other area not of interest in the second image;

on the basis of said known positional relationship identifying said at least one area of interest and other area not of interest in the first image;

registering the first and third images by an image matching process based on said at least one area of interest identified in the first image.

The at least one other area not of interest may be image of background outside the subject, and possibly, in medical images, areas such as the lung cavity within the body. Preferably the image matching process is conducted by looking only, or mainly, at the areas of interest. One way of achieving this is to set the intensities of the areas not of interest to a constant value, e.g. zero, so that the second image has been used, effectively, as a mask to mask out areas which are not of interest. However the area not of interest may be used to an extent in the registration process, and in this case the second modality image is being used to segment into the two areas, rather than to exclude one of them.

The first and second images are preferably obtained on the same imaging apparatus, thus providing a known positional relationship, e.g. by being inherently registered. The first image may be an emission image in which intensity values are related to function in the subject, such as a PET or SPECT image. The second image may be a transmission image of the type mentioned above. The third image may be an image providing detailed structural information, such as an x-ray image, magnetic resonance image or ultrasound image.

The step of registering the first and third images may comprise deriving a positional transformation which maps to each other areas identified in the matching process as corresponding to each other. The matching process may be based on intensity or edge detection or another of the known techniques for matching two images.

Particularly in the medical field, the second image may be used as explained above to correct the first image for attenuation, and the first image may be further processed as is conventional, e.g. by equalisation.

The invention may be embodied in a computer system for processing data sets encoding the images, and the invention extends to a computer program for executing the method on a programmed computer. The invention also extends to a computer program product carrying such a computer program.

The invention will be further described by way of example, with reference to the accompanying drawings in which:

FIG. 5 is an x-ray image of a human body showing detailed structural information;

FIG. 9 is a transmission image with the main edges outlined;

FIG. 10 is a mask generated from FIG. 9;

Figure 1:
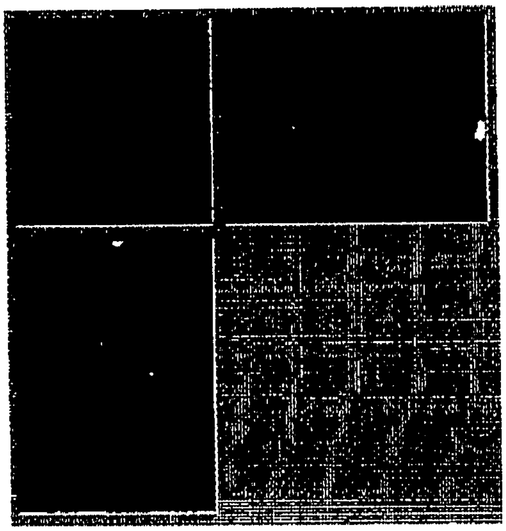
FIG. 1 is a functional emission image of a human body.
Figure 2:
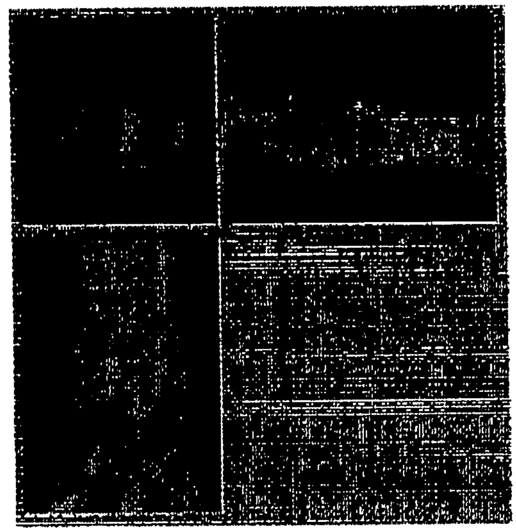
FIG. 2 is a transmission image corresponding to FIG. 1.
Figure 3:
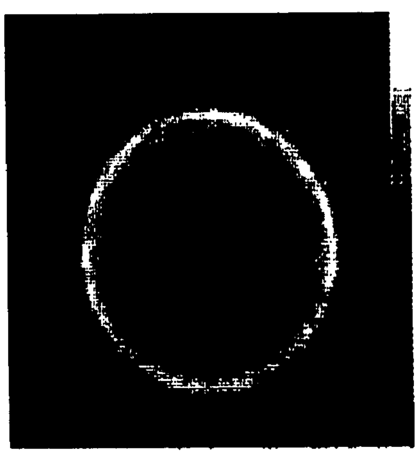
FIG. 3 is a functional emission image of a uniform cylindrical phantom.
Figure 4:
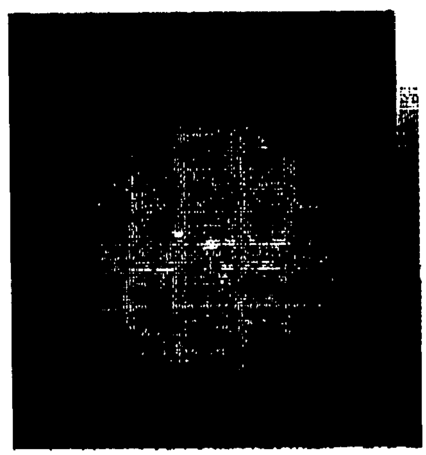
FIG. 4 is an emission image corresponding to FIG. 3 corrected for scattering and attenuation.
Figure 6:
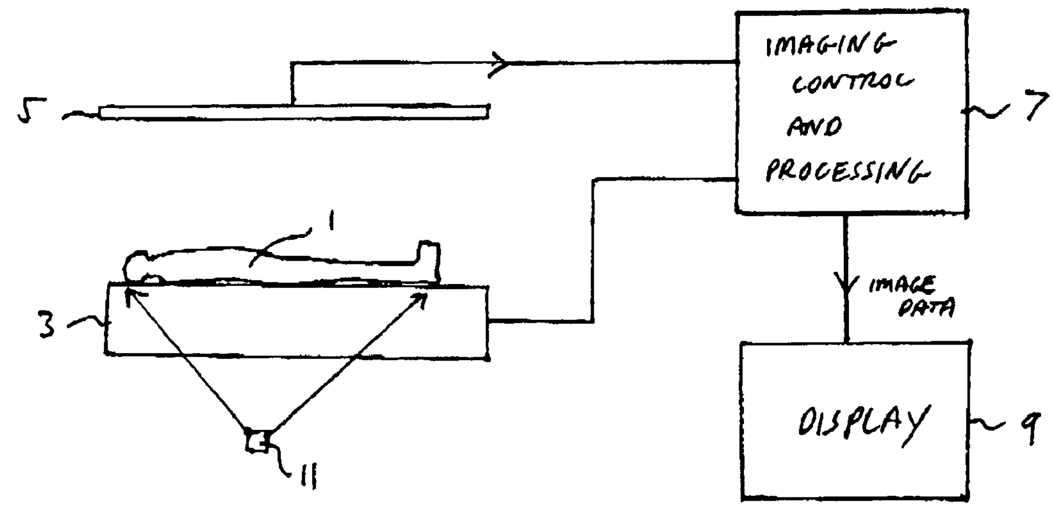
FIG. 6 is a block diagram schematically showing the apparatus needed for the imaging process.

FIG. 6 illustrates schematically the apparatus needed for imaging. A patient 1 lies on a moveable support 3 beneath a detector 5. The detector is suitable for whichever imaging modality is chosen, for instance a gamma or scintillation detector for SPECT imaging. The signals from the detector 5 are supplied to an imaging control and processing unit 7 which produces image data for display on display 9. For the production of a transmission image a radioactive source 11 is provided on the opposite side of the patient from the detector 5. Image data may also be acquired using multiple projections from different angles of placement of the detector 5 (and source 11 if necessary).

Figure 7:
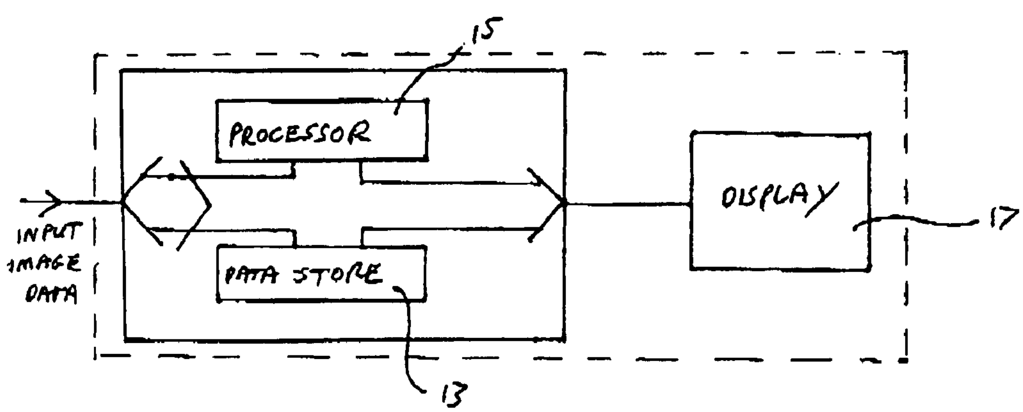
FIG. 7 is a schematic diagram illustrating the apparatus for processing and displaying the image data.

Typically image data is processed by computer before displayed as schematically illustrated in FIG. 7. Data sets encoding the image are stored in a data store 13 and processed by a detector 15 before being displayed on a computer display 17.

Figure 8:
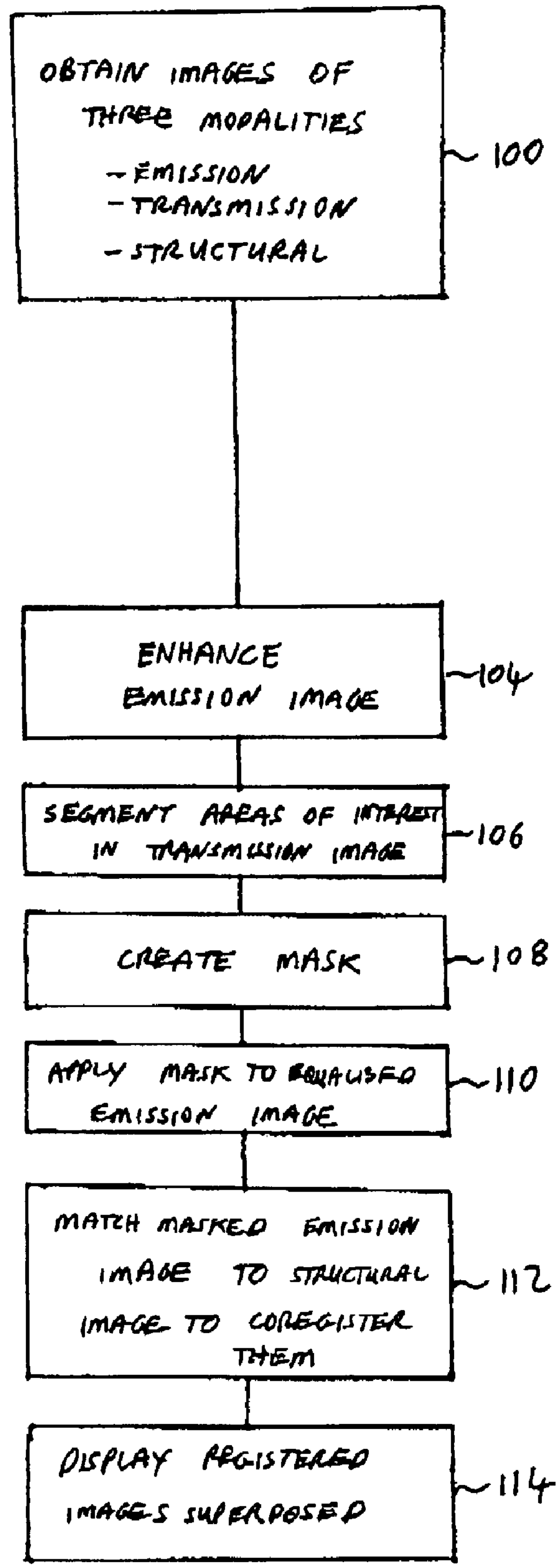
FIG. 8 is a flow diagram explaining one embodiment of the invention.

FIG. 8 illustrates the registration process in accordance with an embodiment of the present invention.

Firstly, in step 100 the three different images are obtained, in this example one being a functional emission image such as a SPECT image, one a transmission image such as a SPTCT image and one a structural image such as an x-ray image. In step 104 an enhancement process is carried out on the emission image. The emission image has a noisy background, and some features are extremely bright in the image: the kidneys, the bladder and the liver are very bright as they evacuate the surplus of radioactive contrast agent. This makes a histogram of the intensities in the image very irregular with a lot of low intensities, a lot of very high intensities and a few intermediate intensities. In the enhancement process the intensities are adjusted so as to attenuate the very bright intensities. Such enhancement may be, for example, a gamma correction, or a histogram equalization, or other process which enhances the separation of features in the image. These techniques are standard in computer vision, can be found in, for example, "Digital Image Processing", by Nick Efford, Addison Wesley, ISBN 0-201-59623-7, which is herein incorporated by reference.

In step 106 the transmission image is segmented to distinguish between different areas of the body and background. The aim is to identify areas which are not of interest in the image. This is achieved by smoothing the transmission image and then detecting the most significant edges in the image. In this example the edge detection may be first detecting points of maximum intensity gradient. The intensity at each of the detected points is then collected and plotted in a histogram. A threshold value, which is the intensity value most represented in the histogram (the mode) is then defined. This intensity value is therefore the modal intensity of those pixels which are on a detected edge. Then all of the pixels in the image are examined and the image is separated into two regions using the above modal intensity value as a threshold. The largest connected component or components of these regions are then extracted. However, other edge detection methods may be used. A transmission image in which the edges have been detected and marked (as a light outline) is shown in FIG. 9.

Sometimes data sets may be presented, or stored, which include the emission image before and after correction for scattering and attenuation (by the transmission image), but the transmission image has been discarded. In this situation a version of the transmission image can be obtained for use in the invention by using the emission image before and after correction, because the difference between the before and after images and a knowledge of the process of correction allows derivation of the transmission image used in that process. This derived "transmission image" may then be subjected to the edge detection process 106 described above.

Figure 11:
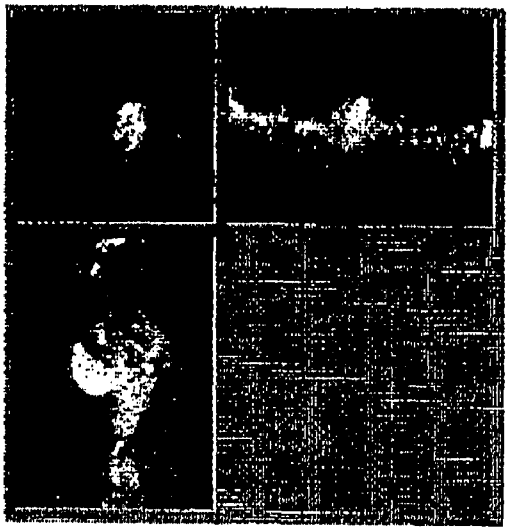
FIG. 11 is an enhanced functional emission image of the human body.
Figure 12:
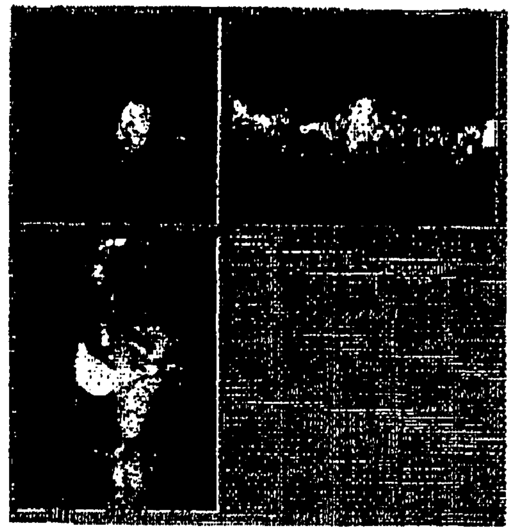
FIG. 12 shows the image of FIG. 11 after masking based on a transmission image.

The segmentation process 106 segments the image into, two areas: the body without the lungs, and dark areas (lungs and background). In one example the dark areas (lungs and background) can then be regarded as a mask as indicated in step 108. A mask generated from FIG. 9 is shown in FIG. 10. This mask is then applied to the equalised emission image in step 110. The application of the mask to the image is relatively easy because of the inherent registration of the transmission and emission images. The result of applying such a mask to the enhanced emission image of FIG. 11 is shown in FIG. 12. In essence this process corresponds to setting intensity values to zero (or another constant value) in the emission image of the lung and background areas identified in the transmission image. However, it should be noted that in fact the segmented transmission image is indicating which pixels are inside the body and which are outside. Sometimes it may be useful to use pixels outside the body in the registration process, as it can make the method more robust. But the knowledge provided by the segmented transmission image as to which pixels are inside the region of interest and which are outside is still useful. The registration algorithm can take account of the region not of interest as a class of intensities describing a particular area, and in this case they could be identified in the mask by setting their intensity value to 1, to include them, rather than 0 to exclude them.

The masked emission image is then available for registration with an image obtained by another modality, such as an x-ray image. The fact that large areas of the image (which are not of interest) have been masked out, or at least identified, makes the relevant and useful information in the combined emission and transmission image more specific. Any of the known matching and registration processes may be used, for instance based on detection and comparison of intensities, or intensity distributions, or detection and comparison of edges or of geometric structures. For example methods based on matching intensities include the calculation of a statistical measure based on a joint histogram of the target image and the masked emission image, and changing the transformation parameters to minimise a similarity criterion. Other matching techniques which may be used are described, for example in "Accurate Three-Dimensional Registration of CT, PET and/or MR Images of the Brain", by Pelizzari, C. A., et al., Journal of Computer Assisted Tomography, Volume 13, 1989; "MRI-PET Registration with Automated Algorithm" by Woods, R. P., et al., Journal of Computer Assisted Tomography, Volume 17, 1993; "The Principle Axis Transformation—A Method for Image Registration", by Albert, N. M., et al., Journal of Nuclear Medicine, Volume 31, 1990; "New Feature Points Based on Geometrical Invariance for 3-D Image Registration", Research Report Number 2149 from the INRIA, Jean-Philippe Thirion; and "A survey of medical Image Registration", by J. B. Antoine Maintz, M. Viergever, Medical Image Analysis, 2(1): 1–36, 1998, all of which are herein incorporated by reference.

Figure 13:
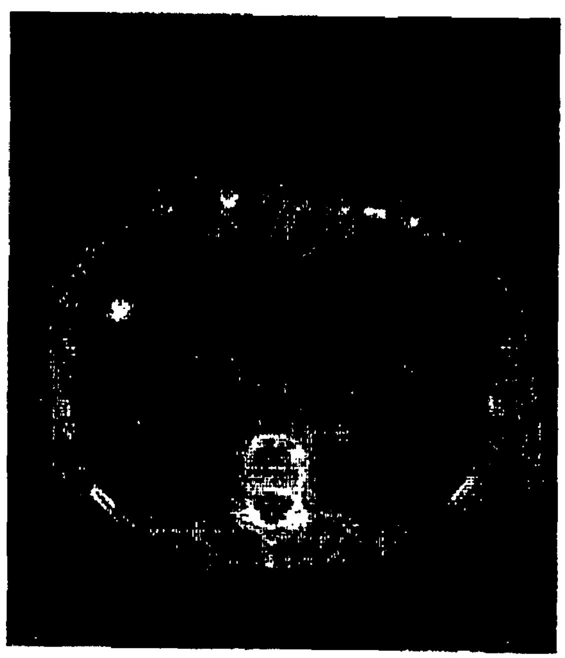
FIG. 13 illustrates the display of a functional emission image registered with a detailed structural image.

Once corresponding areas in the masked emission image and in the other modality (e.g. x-ray) image have been identified, a mapping transformation which indicates which pixels in the frame of the emission image correspond to which pixels in the frame of the other modality image is obtained. This allows the two images to be displayed superposed on one another in step 114. FIG. 13 illustrates such a display of two registered images, one a masked emission image and one an x-ray image. Comparison of this with FIG. 5 shows that an area of high metabolic activity (high content of radioactive marker) is positioned in the left-hand region (marked by the two orthogonal lines) clearly visible as a lighter area in FIG. 11. Also, differing levels of radioactive marker are visible in the central region. Because FIG. 11 includes the anatomically detailed X-ray CT scan it is easy for a clinician to locate the abnormality (e.g. tumour), for instance to plan surgery, radiotherapy or other treatment.

The invention claimed is:

1. A method of registering images of different modalities, comprising:

taking a first image of a subject obtained by an imaging process of a first modality;

taking a second image of the subject obtained by an imaging process of a second modality, said second image having a known positional relationship with the first image;

taking a third image of the subject obtained by an imaging process of a third modality;

distinguishing between at least one area of interest and at least one other area not of interest in the second image;

on the basis of said known positional relationship identifying said at least one area of interest and other area not of interest in the first image;

registering the first and third images by an image matching process based on said at least one area of interest identified in the first image.

2. A method according to claim 1, wherein said at least one other area not of interest comprises image of background outside the subject.

3. A method according to claim 1, further comprising the step of setting the image intensities of the identified at least one other area not of interest to a constant value prior to conducting said matching process.

4. A method according to claim 3, wherein said constant value is zero or one.

5. A method according to claim 1 wherein the first and second images are obtained on the same imaging apparatus thus providing said known positional relationship.

6. A method according to claim 1, wherein the first and second images are inherently registered.

7. A method according to claim 1 wherein the first image is an emission image in which intensity values are related to function in the subject.

8. A method according to claim 1 wherein the second image is a transmission image obtained by transmitting imaging radiation through the subject from one side to the other, the intensity values being related to attenuation and scattering of the radiation by the structure of the subject.

9. A method according to claim 1 wherein the third image is a detailed structural image of the subject.

10. A method according to claim 1 wherein the step of registering the first and third images comprises deriving a positional transformation mapping to each other areas identified in said matching process as corresponding to each other.

11. A method according to claim 1 wherein the matching process comprises matching intensities of said at least one area of interest of the first image with areas in said third image to identify corresponding areas.

12. A method according to claim 1 wherein the intensities in said first image are corrected for attenuation in the subject by means of the second image before said matching process is conducted.

13. A method according to claim 1 wherein the intensities in said first image subjected to an enhancement process before said matching process is conducted.

14. A method according to claim 1 wherein at least one of the first and second images is a nuclear medicine image.

15. A method according to claim 1 wherein the first image is a nuclear medicine image showing the presence of a radioactive marker in the body of the subject.

16. A method according to claim 1 wherein the third image is a medical image.

17. A computer system comprising a data processor, a data storage means and a display, the data processor being adapted to process data in accordance with an executable program stored in the data storage means, wherein the executable program is adapted to execute the method of claim 1 on input data representing said first, second and third images and to display the first and third images superposed in registration with each other on the display.

18. A computer implemented method comprising the steps of claim 1.

19. A computer readable medium comprising the method of claim 18.

* * * * *